US006779727B2

(12) United States Patent
Warther

(10) Patent No.: US 6,779,727 B2
(45) Date of Patent: Aug. 24, 2004

(54) VOTER BALLOTS AND AUTHENTICATION SYSTEM

(75) Inventor: Richard O. Warther, Malvern, PA (US)

(73) Assignee: Vanguard Identification Systems, Inc., West Chester, PA (US)

(*) Notice: Subject to any disclaimer, the term of this patent is extended or adjusted under 35 U.S.C. 154(b) by 0 days.

(21) Appl. No.: 10/147,157

(22) Filed: May 15, 2002

(65) Prior Publication Data

US 2002/0175514 A1 Nov. 28, 2002

Related U.S. Application Data

(60) Provisional application No. 60/292,558, filed on May 22, 2001.

(51) Int. Cl.[7] .................................................. G06K 7/10

(52) U.S. Cl. .................... 235/462.01; 235/386; 235/51; 705/12

(58) Field of Search ........................... 235/462.01, 486, 235/487, 468, 386, 51, 494; 705/12; 283/5

(56) References Cited

U.S. PATENT DOCUMENTS

| | | | | | |
|---|---|---|---|---|---|
| 4,212,393 | A | | 7/1980 | Lenkoff | |
| 4,578,572 | A | * | 3/1986 | Hice | 235/462.49 |
| 4,717,177 | A | * | 1/1988 | Boram | 283/5 |
| 4,807,908 | A | * | 2/1989 | Gerbel | 283/5 |
| 5,492,558 | A | | 2/1996 | Miller et al. | |
| 5,503,665 | A | | 4/1996 | Miller et al. | |
| 5,935,308 | A | | 8/1999 | Siddiqui et al. | |
| 6,124,377 | A | | 9/2000 | Kaiser et al. | |
| 6,457,643 | B1 | * | 10/2002 | Way | 235/462.01 |
| 6,581,824 | B1 | * | 6/2003 | McClure et al. | 235/51 |
| 2002/0084325 | A1 | * | 7/2002 | Reardon | 235/386 |
| 2002/0087394 | A1 | * | 7/2002 | Zhang | 705/12 |
| 2003/0042317 | A1 | * | 3/2003 | Behm et al. | 235/487 |
| 2003/0042731 | A1 | * | 3/2003 | Li | 283/5 |

FOREIGN PATENT DOCUMENTS

| | | | | |
|---|---|---|---|---|
| DE | 4015981 | * | 5/1990 | 235/51 |
| FR | 2674350 | * | 9/1992 | G07C/13/00 |
| JP | 2003-386600 | * | 4/2003 | G07C/13/00 |

* cited by examiner

*Primary Examiner*—Thien M. Le
*Assistant Examiner*—Edwyn Labaze
(74) *Attorney, Agent, or Firm*—Akin Gump Strauss Hauer & Fell, LLP

(57) ABSTRACT

A system includes a plurality of political election ballots, each with a unique, machine readable, serial voter verification number. A receipt is associated with each ballot with the same individual serial number to be given to a voter using the ballot. A computer database contains the serial numbers of all ballots of the plurality used for voting and, with each serial number, a set of specific candidates selected by the voter on that ballot. An internet server provides computer access to the database by voters to verify each candidate recorded as selected by the voter in the election using the unique serial number of the ballot as a key. Each ballot contains bar codes identifying each different candidate for a different political office. At least portions of all of the printed candidate bar codes are not visible to the human eye but are made visible by the voter to identify each candidates selected by the voter on the ballot to register candidate selection by the voter.

5 Claims, 1 Drawing Sheet

VOTER BALLOTS AND AUTHENTICATION SYSTEM

CROSS-REFERENCE TO RELATED APPLICATIONS

This application is related to U.S. Provisional Patent Application No. 60/292,558 filed May 22, 2001.

BACKGROUND OF THE INVENTION

The invention relates to voter ballots, which create machine-readable codes when a selection is registered for more accurate machine counting and to eliminate confusion of the voters' intent.

BRIEF SUMMARY OF THE INVENTION

Briefly stated the invention is an election ballot comprising a plurality of political office candidate names printed in visible ink and a unique bar code printed for each candidate for a voter to enter a candidate selection; and a unique ballot number and bar code of that number printed on the ballot. A plurality of the ballots can be used together with a computer data base and an internet server for each voter to confirm his candidate selections were correct.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
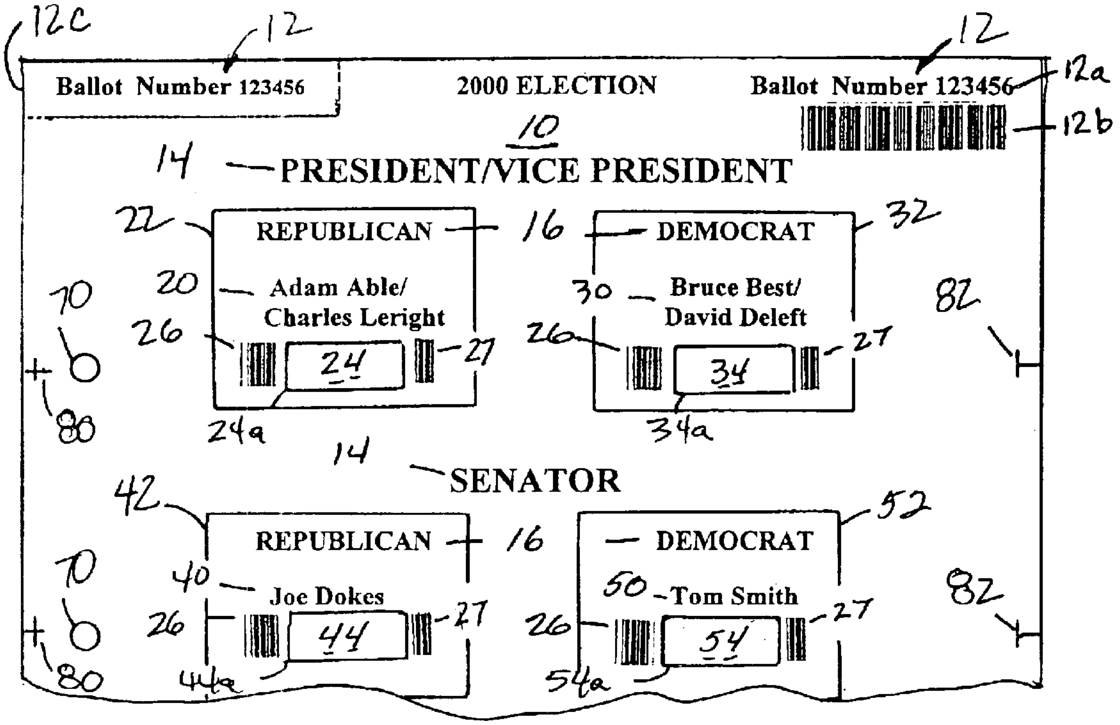
FIG. 1 is a plan view of part of an exemplary ballot according to the present invention before use.
Figure 2:
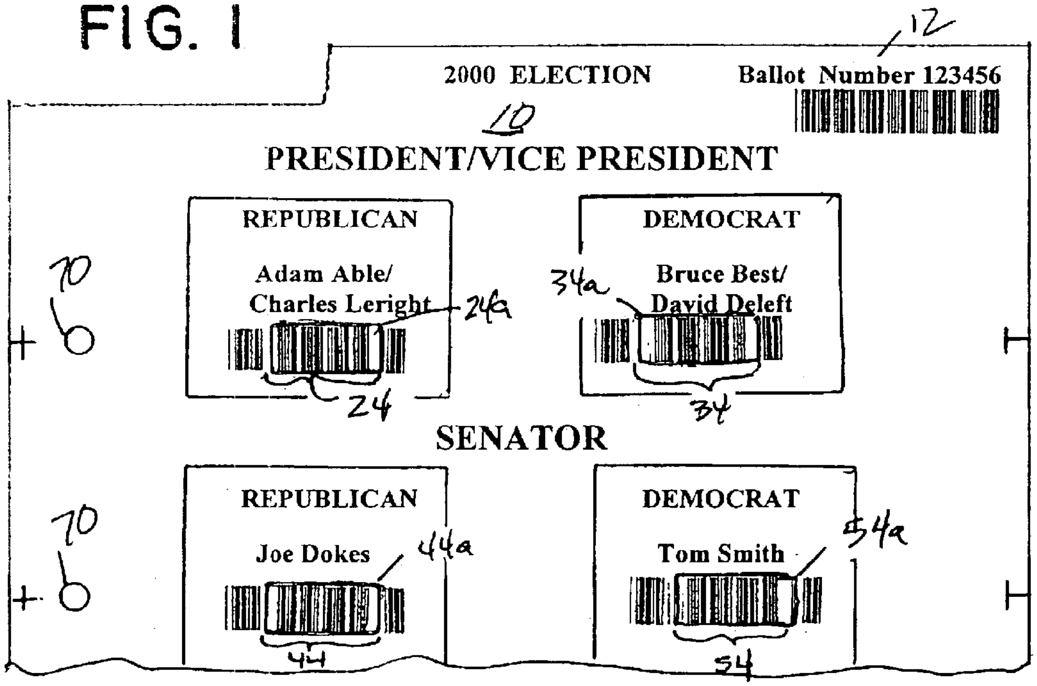
FIG. 2 is a plan view of part of an exemplary ballot according to the present invention after use.

FIG. 1 depicts part of an exemplary ballot 10, which would be given to each voter. Each ballot has a unique serial number 12 assigned to it for the particular election in which it is used. The serial number 13 printed in Arabic numerals 12*a* for human reading and in bar code 12*b* for machine reading. The ballot 10 is printed with the information typically provided on such documents: the political office 14 in question, the parties 16 involved and, of course, the candidates. Each of the candidates names 20, 30, 40, 50, etc. is printed in human readable letters in a larger box 22, 32, 42 etc. Positioned proximal to the printed name is a printed ghost bar code 24, 34, 44, 54, etc., the ends of which are indicated by a visible start bar code 26, and a visible stop bar code 27. The ghost bar code 24, 34, 44, 54 etc. is printed on the ballot 10 in a form of invisible ink. The areas containing the ghost codes can be identified by boxes 24*a*, 34*a*, 44*a*, 54*a*, if desired, printed in another color (e.g., light blue) that would not be readable by a bar code scanner. In the first proposed system, the ghost bar codes 24, 34, 44, 54, etc. are printed with an invisible image former ink and the voter is provided with a felt tip marker containing a liquid image developer. The liquid developer reacts with the previously invisible (latent) image, which is printed between the start and stop bar codes 26–27. The voter selects a candidate by swiping the felt tip marker across the area between the start and stop codes located in the box adjoining the candidate of his selection. Once activated with the marker, the ghost code 24, 34, 44, 54, etc. becomes visible to the voter's eye, as well as to a bar code reader. Numerous patents exist pertaining to latent image inks. These include, without limitation, at least U.S. Pat. Nos. 5,935,308; 5,503,665; 5,492,558; 5,261,703; 5,234,344; 5,217,231; 5,176,460; 5,160,277; 4,586,714; 4,514,177; 4,212,393, all incorporated by reference herein.

Upon completion, the ballot 10 is returned to the polling personnel. Located along the side of the ballot is a corresponding removable receipt 12*c* containing the unique serial number 12 also printed on the ballot. The polling personnel will remove this receipt and provide it to the voter as a confirmation of the voter having delivered the ballot and for further verification of the vote by the voter as will be described.

The activated ballots are collected by the polling personnel and the exposed bar codes machine read to identify the votes for each candidate. At the same time, the individual ballots, including serial numbers, can be automatically loaded into a database for further use. The database would be made available to the public over the Internet or by other telephone access. Each voter can verify that his vote was entered and correctly tabulated by dialing up the database, selecting the correct election, if appropriate, and entering the unique serial number 12 on the ballot receipt 12*c*. The database, in reply, indicates those candidates whose votes were counted from the ballot. This step permits the voter to confirm and positively authenticate whether his vote was, in fact, correctly counted. In the event that a vote was not counted or counted incorrectly, the voter then can petition the voting authorities individually to challenge the particular vote count. This portion of the invention is unique because it allows a voter to authenticate whether his or her vote has been counted and if his or her selections have been recorded correctly. Preferably the ballot is scanned and recorded upon deposit by the voter in a ballot receiving receptacle. Alternatively, the ballots can be batch processed Moreover, this voting system offers several advantages. First, since the ballot of this invention is a paper document, it can be scanned over and over again creating a paper trail that can be rescanned in the event tampering of the ballot is in question. Second, the paper ballot is not perforated to register a vote so there is no chad problem. Third, the invention can be facilitated and implemented with off the shelf hardware and technology. Currently, there are a number of sheet scanners available on the open market that will give a very high percentage of first time scan acceptances and an extremely high level of data integrity, especially if error correction algorithms are introduced into the bar code symbology. For instance, a counting program utilizing the alphameric bar code such as code 128, or code 309 with error correction algorithms, can obtain a very high level of data integrity while simultaneously creating an exceptionally quick count of votes when fed through a sheet feeder. Fourth, this approach can be implemented without special equipment that must be fabricated, manufactured, or created. If the ghost code is transformed into a bar code dark enough for a person to see, a scanner should be able to read it.

Safeguards can be provided when the ballots 10 are created and printed in order to confirm that the invisible ghost ink used on the ballot is present. This confirmation can be done by accommodating corresponding active figures on the side of the form that can be test activated at the time of printing. It is important that the "test symbols", i.e., circles, stars, blocks, boxes or marks 70 of some kind, can be tested and activated at the time of printing or at a time prior to actually handing the ballots to the voters at the polls. Indeed, symbols can be provided for use by poll workers to mark the ballot before handed to a voter and/or after the ballot is handed back to the poll worker. This process authenticates the presence of the invisible, pre-activated invisible ink on the voters' ballots prior to reaching the polling booth as well as providing a tool for poll workers' marking of the ballot, if necessary.

Enhancements of the latent ink image may be necessary to maintain a desired minimum print contrast signal of seventy-five (75) nanometers after activation, which is important to reading such bar codes with conventional bar code scanning equipment.

One of the unique features of this invention is that it eliminates the possibility of tampering with the results of the election. Counted votes can be reauthenticated through examination of paper documents, whereas strictly electronic approaches allow for tampering with the data and manipulation of information from one location to another. A printed document is still the most secure way of authenticating and confirming a voter's choices in a voting booth. Allowing voters to confirm independently and later appeal a posted vote permits individuals to positively substantiate their candidate selections and maintain anonymity.

As an alternative to simply printing a candidate bar code in invisible ink, the bar code and the candidate's name can both be printed invisible ink adjoining a visible printing of the candidate's name so that the positive reappearance of the candidate's name with the bar code can provide instant confirmation to the voter that his vote has been correctly entered.

One important element of the invention is to print both the invisible latent image and the visible start and stop codes bordering of the ghost code in correct registration to each other. This registration requires a printing press to be at least a two-color press that works in combination or in registration to each printing station. It will also require a registration cross hair 80 or other registration confirmation design 82 to be present so that the bars of the invisible code to be activated correspond to the visible bars that are present as start and stop codes. For the complete bar code (visible start and stop codes and ghost code) to scan as one code, the start and stop codes and the ghost codes must correspond to each other in a pattern that accommodates both standard bar code symbology rules and configuration, or bar code symbology rules and configuration for a specific bar code symbology selected. Not only must there be a symbol somewhere on the sheet constituting the ballot to enable the ballot to be pretested to show that the invisible ink is present, but the symbol, once activated, should also identify whether the registration of the invisible ink image and the visible start and stop codes register to each other correctly. This registration is important in manufacturing the product itself. Otherwise, the revealed (ghost) bar codes will not scan once activated. The picket fence design of a one dimensional bar code need to be sufficiently evenly spaced and configured for a scanner to pick up and get a high, first time success scan rate. The spacing shown in the figures between the start and stop codes 26, 27 and the ghost codes 24, 34, 44, 54, are exaggerated for illustration clarity.

An alternative to the use of a separate marker with developer would be the provision in the ballot of encapsulated component(s) in the ink such as the types of coatings used to make pressure sensitive, carbonless copies. See, for example, U.S. Pat. No. 4,760,108. This system does not require the use of a liquid activator. Any blunt hard object can be used to apply pressure to the area between the printed code ends to break the one or more encapsulated components so that a mark generating reaction occurs.

In still a different variation, bar codes could be printed beneath each candidate and covered with an opaque substance, which can be removed by scrapping the substance from the surface of the ballot in the manner of a lottery ticket.

Although preprinting of the ballots at a central location well before the election is desired, it would also be possible to permit local polling personnel to create each ballot on a laser printer at each polling place. The personnel could bring up a file or enter information about a voter into a standard PC and then print out a ballot pertaining to that particular election. The software among all of the polling places would have to be standardized to allow this type of printing to occur. Once in place, however, the polling personnel would have the option to print the ballot on site. Printing could be done on multicolor printers using conventional black and latent (ghost) inks or printing can be done in all conventional ink. In the former case, voters would vote as indicated before using an appropriate activating marker or other tool to reveal the hidden (ghost) bar code. In the latter case, the voter could indicate his or her preference by crossing out the bar codes of those candidates they do not wish to vote for.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A voter verification system comprising:

a plurality of political office election ballots, each printed with a unique, machine readable, serial number;

a receipt removably coupled with a remainder of each ballot and bearing the same unique serial number to be given to a voter using the ballot to register the voter's vote;

a computer database containing the unique serial numbers of all of the ballots of the plurality used for voting and, with each serial number, a set of specific candidates selected by the voter on that ballot; and an internet server providing computer access to the database by voters to verify each candidate recorded as selected by the voter in the election using the unique serial number of the ballot as a key.

2. The system according to claim 1 wherein each ballot of the plurality contains a plurailty of bar codes, each identifying a different candidate for a different political office and wherein at least portions of some of the candidate bar codes are not visible to the human eye and wherein all of the bar codes of at least some of the political candidates listed on the ballot are visible to the human eye and identify each candidates selected by the voter using the ballot.

3. The system according to claim 2 wherein at least a portion of the bar code associated with each candidate name on each ballot is printed in a ink at least generally invisible to the human eye, which requires manual contact of the ballot in the area of the bar code to become visible, thereby confirming the selection of a candidate and rendering the candidate's selection on the ballot machine readable.

4. The system according to claim 2 wherein at least a portion of the bar code associated with each candidate name on the ballot is printed in visible ink and is covered and hidden from view by a removable, opaque coating.

5. The system according to claim 2 wherein at least a portion of the bar code associated with each candidate name on the ballot is printed in visible ink and is fully visible before being marked by a voter making a candidate selection.

* * * * *